(12) United States Patent
Loessel et al.

(10) Patent No.: US 9,988,498 B2
(45) Date of Patent: Jun. 5, 2018

(54) METHOD FOR PRODUCING SIOH-FUNCTIONAL POLYSILOXANES

(71) Applicant: Wacker Chemie AG, Munich (DE)

(72) Inventors: Georg Loessel, Emmerting (DE); Manfred Meisenberger, Burghausen (DE); Wolfgang Wewers, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 361 days.

(21) Appl. No.: 14/899,153

(22) PCT Filed: Jun. 18, 2014

(86) PCT No.: PCT/EP2014/062873
§ 371 (c)(1),
(2) Date: Dec. 17, 2015

(87) PCT Pub. No.: WO2015/000706
PCT Pub. Date: Jan. 8, 2015

(65) Prior Publication Data
US 2016/0145396 A1  May 26, 2016

(30) Foreign Application Priority Data

Jul. 3, 2013  (DE) .................. 10 2013 212 980

(51) Int. Cl.
*C08G 77/16* (2006.01)
*C08G 77/06* (2006.01)

(52) U.S. Cl.
CPC ............ *C08G 77/16* (2013.01); *C08G 77/06* (2013.01)

(58) Field of Classification Search
None
See application file for complete search history.

(56) References Cited

U.S. PATENT DOCUMENTS

| 2,758,124 A | 8/1956 | Schwenker |
| 3,489,782 A | 1/1970 | Pruvost et al. |
| 3,668,180 A | 6/1972 | Brennan et al. |
| 6,069,220 A | 5/2000 | Hoffmann et al. |
| 2006/0167202 A1 | 7/2006 | Schattenmann et al. |

FOREIGN PATENT DOCUMENTS

| DE | 954198 | 12/1956 |
| DE | 198 00 023 A1 | 7/1999 |
| DE | 10 2005 003 899 A1 | 8/2006 |

*Primary Examiner* — Clinton A Brooks
(74) *Attorney, Agent, or Firm* — Brooks Kushman P.C.

(57) ABSTRACT

Organopolysiloxanes having an OH content of from 3.0-10.0 weight percent are continuously produced by continuously feeding chlorosilanes, alkoxysilanes, water, and non-polar solvent essentially non-miscible in water, continuously discharging a reaction mixture containing organopolysiloxanes dissolved in a solvent phase, and optionally separating organopolysiloxanes from the solvent phase, wherein the chlorosilanes and alkoxysilanes are added in respective weight fractions of 95-60% and 5-40% based on the total weight of chlorosilanes and alkoxysilanes. The process does not employ and polar solvents, and produces products with improved flash points while minimizing complexity and expense of waste water treatment.

7 Claims, No Drawings

METHOD FOR PRODUCING SIOH-FUNCTIONAL POLYSILOXANES

CROSS REFERENCE TO RELATED APPLICATIONS

This application is the U.S. National Phase of PCT Appln. No. PCT/EP2014/062873 filed Jun. 18, 2014, which claims priority to German Application No. 10 2013 212 980.7 filed Jul. 3, 2013, the disclosures of which are incorporated in their entirety by reference herein.

BACKGROUND OF THE INVENTION

1. Field of the Invention

The invention relates to a process for the continuous production of SiOH-functional polysiloxanes.

2. Description of the Related Art

U.S. Pat. No. 3,668,180A describes the production of polysiloxanes by a multi-stage process using a mixture consisting of halosilanes, an organic solvent, water and alcohol.

DE102005003899A1 describes the production of polysiloxanes by reaction of halosilanes with water and alcohol in the presence of the desired polysiloxane.

U.S. Pat. No. 5,223,636 describes the production of partially alkoxylated polysiloxanes using an initial charge consisting of an alkoxysilane, to which halosilanes, water and alcohol are continuously added in such a way that the alkoxysilane-containing initial charge is always kept at boiling point.

At issue in each of these cases are complex multistage processes which comprise reacting either only halosilanes with alcohol in the presence of water and nonpolar and polar solvents, or alkoxysilanes with catalytic amounts of acid or in some cases with 0.5 to 20 wt % of chlorosilanes based on the employed amount of alkoxysilanes in the presence of water and solvent, to afford polysiloxanes, wherein after the reaction the solvent-containing product phase is removed from the aqueous phase comprising the HCl.

U.S. Pat. No. 3,489,782 teaches that it is possible to produce SiOH-functional polysiloxanes by performing a first step where chlorosilanes or mixtures of chlorosilanes and alkoxysilanes are mixed with polar solvents and a second step where this mixture and water, in an appropriate amount, is continually supplied to a reactor. The rate at which the polycondensate-containing phase is discharged from the reactor is commensurate with the rate at which reactants are supplied. By contrast, DE954198 describes a continuous loop process in which exclusively chlorosilanes or mixtures of chlorosilanes together with water and polar solvents are reacted to afford polysilicone oils, or gels no longer soluble in the aqueous phase, for example highly condensed methylpolysilicone resins, reference always being made to complete hydrolysis of the chlorosilanes.

It may generally be concluded that chlorosilane hydrolyses carried out in a batch process require not only nonpolar solvents and alcohols but also additional polar compounds which act as so-called compatibilizers between the aqueous phase and the water-insoluble solvent phase comprising the chlorosilanes. The purpose of these compatibilizers is to promote the hydrolysis/condensation reaction of the chlorosilanes dissolved in the solvent phase, with the aqueous phase.

Such compatibilizers may typically be selected, in U.S. Pat. No. 3,489,782 for example, from among carboxylic esters, for example ethyl acetate, as well as acetone for example. It will be appreciated that such esters are partially dissolved in the HCl-acidified reaction phase and thus undergo cleavage to afford corresponding amounts of alcohol.

Predominantly alkoxysilane-based continuous and/or batchwise production processes necessarily generate the corresponding alcohols in the aqueous phase.

The alcohol present in the HCl-acidified reaction phase may react with HCl to afford alkane chloride which in turn leads to high environmental pollutant levels in the wastewater resulting from the production process. These wastewater pollutant levels are measured as COD content in ppm (COD=chemical oxygen demand) and as POX content in ppm and stand for the concentration of alcohol (COD) and alkane chloride (POX) measured in the wastewater.

Wastewaters with higher concentrations of alcohol also have low flashpoints. When alcohol is already added at the start, the longer reaction time with HCl results in a markedly higher POX content.

These factors taken together result in highly complex and costly treatments of the wastewater generated by the production process.

DE 19800023 A1 describes a continuous process for producing polysiloxanes having a low SiOH content where alkoxysilanes are reacted in nonpolar solvent by addition of hydrochloric acid and optionally a small amount of chlorosilanes without polar solvent.

SUMMARY OF THE INVENTION

The invention provides a continuous process for producing organopolysiloxanes having an OH content of 3.0-10.0 wt %, which comprises continuously adding to a reaction mixture chlorosilanes, alkoxysilanes, water and nonpolar solvent having a solubility in water of not more than 1 g/l at 20° C. and 1 bar and continuously discharging reaction mixture, wherein the process comprises simultaneously adding the chlorosilanes in a weight fraction of 95% to 60% and the alkoxysilanes in a weight fraction of 5% to 40% based on the sum of chlorosilanes and alkoxysilanes and wherein no polar solvents are added.

DETAILED DESCRIPTION OF THE PREFERRED EMBODIMENTS

The process produces the organopolysiloxanes having an OH content of 3.0 to 10.0 wt % in simple and economical fashion. A hydrolysis-condensation reaction takes place. In contrast to the known processes the process according to the invention can produce the organopolysiloxanes having an OH content of 3.0 to 10.0 wt % with very short residence times even when water-soluble polar solvents including alcohols are eschewed. On account of the short residence times and relatively small amounts of alkoxysilanes, the formation of alkane chlorides from alcohol and HCl is impeded and the amount of alcohol reduced.

This also results in crucial cost advantages compared to the known continuous and batchwise processes since, in addition to the greater throughput due to short residence times, the complexity of the wastewater treatment may simultaneously be markedly reduced due to lower COD and POX pollutant levels. The wastewaters likewise have higher flash points of above 55° C.

It is preferable when the chlorosilanes, alkoxysilanes, water and the nonpolar solvent are continuously added to the reaction mixture in a loop reactor and the reaction mixture is continuously discharged from the loop reactor.

It is preferable when the chlorosilanes are added in a weight fraction of 80% to 50% and the alkoxysilanes are added in a weight fraction of 20% to 50% based on the sum of chlorosilanes and alkoxysilanes.

An aqueous phase and a solvent phase are formed; these are intimately mixed. Water is preferably added in amounts such that an HCl concentration in the aqueous phase of 5-35 wt % is established.

The nonpolar solvent preferably has a solubility in water of not more than 0.5 g/l at 20° C. and 1 bar. Examples of nonpolar solvents include hydrocarbons such as pentane, n-hexane, hexane isomer mixtures, heptane, octane, naphtha, petroleum ethers, benzene, toluene, and xylenes. Particular preference is given to toluene and xylenes.

Polar solvents, which are not added, are in particular alcohols such as methanol and ethanol; ethers such as dioxane, tetrahydrofuran, diethyl ether, diisopropyl ether, diethylene glycol dimethyl ether; ketones such as acetone, methyl ethyl ketone, diisopropyl ketone, methyl isobutyl ketone (MIBK); esters such as ethyl acetate, butyl acetate, propyl propionate, ethyl butyrate, ethyl isobutyrate; carbon disulfide and nitrobenzene, or mixtures of these solvents.

The nonpolar solvent is preferably supplied to the reaction mixture in amounts such that solids contents of 30-45 wt % are established. The solids content is the amount of organopolysiloxanes which are formed, dissolved in the solvent phase.

The organopolysiloxane dissolved in the solvent phase is preferably continuously separated from the aqueous phase. The organopolysiloxane is preferably freed of solvent by distillation.

It is preferable when chlorosilanes, alkoxysilanes, water and the nonpolar solvent are added to the reaction mixture, and reaction mixture is continuously discharged in the manner described above, that very short residence times of from 1 minute to 30 minutes, preferably 2 minutes to 15 minutes, are established.

It is preferable when the organopolysiloxanes having an OH content of 3.0-10.0 wt % have the general formula I $$R_n SiO_{4-n} \quad (I),$$

where
R represents an OH, $C_1$-$C_{18}$ hydrocarbon radical, or $C_1$-$C_6$ alkoxy radical and
n is 0, 1, 2 or 3 and
n has an average value of from 1.0 to 2.0.

The OH content of the organopolysiloxanes relates to the OH groups bonded directly to the silicon atoms. The OH content is preferably 3.0 to 8.0 wt %.

It is preferable that n has an average value of from 1.4 to 1.8.

It is further preferable that the organopolysiloxanes having an OH content of 3.0 to 10.0 wt % have an average molecular weight $M_w$ of from 1000 to 3500, in particular from 1500 to 3000. It is also preferable that the organopolysiloxanes have a Tg (glass transition temperature) of from 30° C. to 80° C., in particular from 35° C. to 75° C.

Preferably, the halosilanes have the general formula II $$R^1_m SiCl_{4-m} \quad (II),$$

where
$R^1$ represents a $C_1$-$C_{18}$ hydrocarbon radical, and
m is 0, 1, 2 or 3.

It is also preferable that the alkoxysilanes have the general formula III $$R^2_o SiR^3_{4-o} \quad (III),$$

where
$R^2$ represents a $C_1$-$C_{18}$ hydrocarbon radical,
$R^3$ represents a $C_1$-$C_6$ alkoxy radical, and
o is 0, 1, 2 or 3.

The $C_1$-$C_{18}$ hydrocarbon radicals R, $R^1$ and $R^2$ are preferably $C_1$-$C_6$ alkoxy radicals, in particular methyl, ethyl or propyl radicals, or phenyl radicals.

All of the symbols in the formulae given above each have their meanings independently of one another. The silicon atom is tetravalent in all formulae. The constituents of the silicone mixture sum to 100 wt %.

The OH content of the organopolysiloxanes is determined according to Zerewittinoff.

The flash point is determined according to ISO 3679. The HCl concentration in the wastewater phase is determined by direct titration.

The COD in ppm is determined photometrically with the Dr. Lange LCK 514, LCK 414 or LCK 314 COD cuvette tests in accordance with DIN ISO 15705: "Wasserbeschaffenheit-Bestimmung des chemischen Sauerstoffbedarfs (ST-CSB)-Küvettentest".

The POX concentrations is determined in accordance with "DIN 38409 Teil H25": "Bestimmung der ausblasbaren, organisch gebundenen Halogene (POX)".

The residence time min=60 min/(sum of all reactant streams/h/volume of the reaction loop).

The solids content of organopolysiloxanes in wt %=kg of resin/(kg of resin+kg of solvent)×100

The Tg (glass transition temperature) is determined according to DSC 0 . . . 110R5.

0.0-110.0° C.; 5.00° C./min

The sample is analyzed in a perforated aluminum crucible.

The average molecular weight $M_w$ is determined as follows:

Eluent: THF
Columns: 10e4+500+100
Column temperature: 45° C.
Flow rate: 1.00 ml/min
Pressure: 75.9 bar
Detector: RI detector
Calibration: conventional (polystyrene standards)
polynomial 3
04_10e4+500+100_261011
correction with internal standard
Injection volume: 100 μl
Sample concentration: 3.00 mg/ml In the following examples, unless otherwise stated, all amounts and percentages are based on weight, all pressures are 0.10 MPa (abs.) and all temperatures are 20° C.

EXAMPLES

Examples 1-5 are produced by the process according to the invention in a 30 liter loop (glass equipment) with downstream continuous phase separation. The crude product thus obtained is freed of solvent by distillation.

Example 1

3.84 kg/h of dimethyldichlorosilane, 50.3 kg/h of phenyltrichlorosilane and 30.72 kg/h of methyltriethoxysilane together with 69.12 kg/h of water and 79 kg/h of toluene are simultaneously passed into a loop via a mixing zone. The following process parameters are established:

Solids content (=organopolysiloxanes dissolved in toluene): 36-37 wt %

HCl concentration in aqueous phase: 27-29 wt %

Residence time: 5-10 minutes

Reaction temperature: 60-65° C.

The wastewater removed from the product has the following parameters:

COD ppm: 228,767

POX ppm: 0.3-2.5

Flash point: 56.5° C.

The crude product is freed of the solvent by distillation. This affords a free-flowing polysilicone resin having an SiOH content of 3.0-4.5 wt %, a molecular weight $M_w$ of 1800-3000 and a Tg (glass transition temperature) of 45° C.-65° C.

Examples 2 and 3

Differ in terms of employed reactant amounts only in the amount of water and in the process and product parameters shown in table 1:

TABLE 1

|  | Water (kg/h) | HCl concentration in aqueous phase (wt %) | SiOH content (wt %) |
| --- | --- | --- | --- |
| Example 2 | 108.3 | 18-22 | 3.5-5.0 |
| Example 3 | 150 | 10-15 | 5.0-6.0 |

Example 4

16.3 kg/h of phenyltriethoxysilane and 32.75 kg/h of phenyltrichlorosilane together with 69.12 kg/h of water and 79 kg/h of toluene are simultaneously passed into a loop via a mixing zone. The following process parameters are established:

Solids content (=resin dissolved in toluene): 30-31 wt %

HCl concentration in aqueous phase: 12-14 wt %

Residence time: 5-10 minutes

Reaction temperature: 60-65° C.

The wastewater removed from the product has the following parameters:

COD ppm: 150,000

POX ppm: <1

Flash point (ISO 3579): 67° C.

The crude product is freed of the solvent by distillation. This affords a free-flowing polysilicone resin having an SiOH content of 5.0-7.0 wt %, a molecular weight $M_w$: 1800-3000 and a Tg (glass transition temperature) of 50° C.-75° C.

Example 5

27.8 kg/h of phenyltriethoxysilane, 24.5 kg/h of phenyltrichlorosilane and 20.3 kg/h of propyltrichlorosilane together with 73.3 kg/h of water and 68.2 kg/h of toluene are simultaneously passed into a loop via a mixing zone. The following process parameters are established:

Solids content (=resin dissolved in toluene): 35-37 wt %

HCl concentration in aqueous phase: 25-26 wt %

Residence time: 8-14 minutes

Reaction temperature: 60-65° C.

The wastewater removed from the product has the following parameters:

COD ppm: 140,000

POX ppm: <1

Flash point (ISO 3579): 73° C.

The crude product is freed of the solvent by distillation. This affords a free-flowing polysilicone resin having an SiOH content of 3.0-5.0 wt %.

Examples 6-7

Are produced by the process according to the invention in a 1.55 liter loop (glass equipment) with downstream continuous phase separation. The crude product thus obtained is freed of solvent by distillation.

Example 6

1.46 kg/h of phenyltriethoxysilane, 1.26 kg/h of phenyltrichlorosilane and 1.125 kg/h of propyltrichlorosilane together with 4.64 kg/h of water and 3.4 kg/h of toluene are simultaneously passed into a loop via a mixing zone. The following process parameters are established:

Solids content (=polysilicone resin dissolved in toluene): 38-39 wt %

HCl concentration in aqueous phase: 22-23 wt %

Residence time: 7-8 minutes

Reaction temperature: 65-70° C.

Alkoxysilane: 38 wt %

Chlorosilane: 62 wt %

The wastewater removed from the product has the following parameters:

COD ppm: 156,000

POX ppm: 2.5

Flash point (ISO 3579): 73° C.

The crude product is freed of the solvent by distillation. This affords a free-flowing polysilicone resin having an SiOH content of 4.9 wt %.

Example 7

Noninventive with Excessively High Alkoxysilane Content 2.3 kg/h of phenyltriethoxysilane, 0.45 kg/h of phenyltrichlorosilane and 1.125 kg/h of propyltrichlorosilane together with 4.64 kg/h of water and 3.4 kg/h of toluene are simultaneously passed into a loop via a mixing zone. The following process parameters are established:

Solids content (=polysilicone resin dissolved in toluene): 38-39 wt %

HCl concentration in aqueous phase: 16-17 wt %

Residence time: 8-9 minutes

Reaction temperature: 65-70° C.

Alkoxysilane: 59 wt %

Chlorosilane: 41 wt %

The wastewater removed from the product has the following parameters:
COD ppm: 118,000
POX ppm: 12
Flash point (ISO 3579): 7° C.

The crude product is freed of the solvent by distillation. This affords a free-flowing polysilicone resin having an SiOH content of 4.6 wt %.

Example 8

(Noninventive) relates to a batch mixture customary at WACKER CHEMIE AG where SiOH-functional polysiloxane resins are produced by hydrolysis-condensation reaction of chlorosilanes in the presence of water, compatibilizer (polar solvent) and a nonpolar water-insoluble solvent.

Residence time: several hours.

The entire batch is removed from the HCl-acidified aqueous phase, washed neutral and subsequently distilled. This affords a free-flowing polysiloxane resin having an SiOH content of 3.0-5.0 wt %.

The wastewater removed from the product has the following parameters:
COD ppm: 120,000
POX ppm: 10-25
Flash point (ISO 3579): 55° C.

Example 9

(Noninventive) relates to a batch mixture customary at WACKER CHEMIE AG where SiOH-functional polysiloxane resins are produced under acid catalysis by hydrolysis-condensation reaction of alkoxysilanes in the presence of water and a nonpolar water-insoluble solvent.

Residence time: several hours.

The entire batch is removed from the HCl-acidified aqueous phase, washed neutral and subsequently distilled. This affords a free-flowing polysiloxane resin having an SiOH content of 5.0-6.0 wt %.

The wastewater removed from the product has the following parameters:
COD ppm: 550,000
POX ppm: 13-24
Flash point (ISO 3579): 23° C.

The examples 7, 8 and 9 reflect the current state of the art and generally also provide SiOH-functional polysilicone resins, but with the disadvantages that the described processes are more costly, since additional feedstocks (polar solvents and alcohols, more alkoxysilanes) and longer residence times are required, as a result of which the wastewaters generated from these processes are burdened with very much higher pollutant levels (higher COD values; higher POX values and lower flash points) and thus also require more complex treatment.

The invention claimed is:

1. A continuous process for producing organopolysiloxanes having an OH content of 3.0-10.0 wt. %, comprising: continuously adding to a reaction mixture chlorosilanes, alkoxysilanes, water, and nonpolar solvent having a solubility in water of not more than 1 g/l at 20° C. and 1 bar, and continuously discharging reaction mixture, wherein the chlorosilanes in a weight fraction of 95% to 60% and the alkoxysilanes in a weight fraction of 5% to 40% based on the sum of chlorosilanes and alkoxysilanes are added simultaneously, and wherein no polar solvents are added, the reaction mixture having an aqueous phase and a solvent phase.

2. The process of claim 1, wherein chlorosilanes, alkoxysilanes, water and nonpolar solvent are continuously added to the reaction mixture in a loop reactor, and reaction mixture is continuously discharged from the loop reactor.

3. The process of claim 1, wherein water is added in amounts such that an HCl concentration of 5-35 wt. % is established in the aqueous phase.

4. The process of claim 1, wherein at least one nonpolar solvent is a hydrocarbon solvent.

5. The process of claim 1, wherein the nonpolar solvent is supplied to the reaction mixture in an amount such that a solids content of 30-45 wt. % is established, wherein the solids content is the amount of organopolysiloxanes formed in the reaction dissolved in the solvent phase.

6. The process claim 1, wherein the solvent phase containing dissolved organopolysiloxanes is continuously separated from the aqueous phase.

7. The process of claim 1, wherein the organopolysiloxanes comprise organopolysiloxanes having the formula I $$R_n SiO_{4-n} \tag{I},$$

where
R each individually are an OH radical, a $C_1$-$C_{18}$ hydrocarbon radical, or a $C_1$-$C_6$ alkoxy radical,
n is 0, 1, 2 or 3, and
n has an average value of from 1.0 to 2.0.

* * * * *